United States Patent [19]

Schultz

[11] 4,099,593
[45] Jul. 11, 1978

[54] AUTOMOBILE LOCK MECHANISM

[76] Inventor: Norman W. Schultz, 3834 W. 118th St., Hawthorne, Calif. 90250

[21] Appl. No.: 695,770

[22] Filed: Jun. 14, 1976

[51] Int. Cl.² .......................................... B60R 25/00
[52] U.S. Cl. ..................................... 180/114; 70/160; 70/163; 70/241; 109/59 R; 200/61.7; 200/61.8
[58] Field of Search .............. 180/114; 200/61.8, 61.7; 70/240, 241, 256, 257, 163, 160; 109/53, 56, 57, 58, 59 R, 61, 52, 51

[56] References Cited

U.S. PATENT DOCUMENTS

| | | | |
|---|---|---|---|
| 1,348,090 | 7/1920 | Cooper | 180/114 |
| 1,419,227 | 6/1922 | Coo | 180/114 X |
| 1,447,462 | 3/1923 | Butscher | 109/58 |
| 1,463,218 | 7/1923 | Lauritzen | 180/114 X |
| 3,010,531 | 11/1961 | Flora | 180/114 |
| 3,282,369 | 11/1966 | Pangborn | 70/241 X |
| 3,744,285 | 7/1973 | Barmherzig | 70/241 |
| 3,756,341 | 9/1973 | Tonkowich | 180/114 |
| 3,773,138 | 11/1973 | Killmeyer | 180/114 |
| 3,815,089 | 6/1974 | Beltrami | 180/114 X |
| 3,842,761 | 10/1974 | Bloom | 109/59 |

Primary Examiner—John P. Silverstrim
Attorney, Agent, or Firm—George F. Smyth

[57] ABSTRACT

The vehicle locking apparatus is used in a vehicle having a motor compartment, a motor therein, a hood for the compartment and a starting system for the motor. A safe compartment is positioned within the passenger compartment, and includes a lockable door. A switch within the safe disconnects the starting system from the motor when the door is closed. A hood lock has an actuator within the safe which is positioned to lock the hood when the door is closed. The safe compartment has an outer shell of heavy gauge metal interconnected with an inner shell of heavy gauge metal. The door is locked by a locking cam which is received in a slot on the inner shell and a slot on an inwardly extending projection of the door. When the door is closed the motor cannot be started and the hood is locked. The slots provide a double locking action making it difficult to force the door open when the safe compartment is locked.

Additionally, the door may include an inwardly extending projection with a slot therein to receive the locking cam. The locking cam may, thus, provide a double locking action for the door.

18 Claims, 7 Drawing Figures

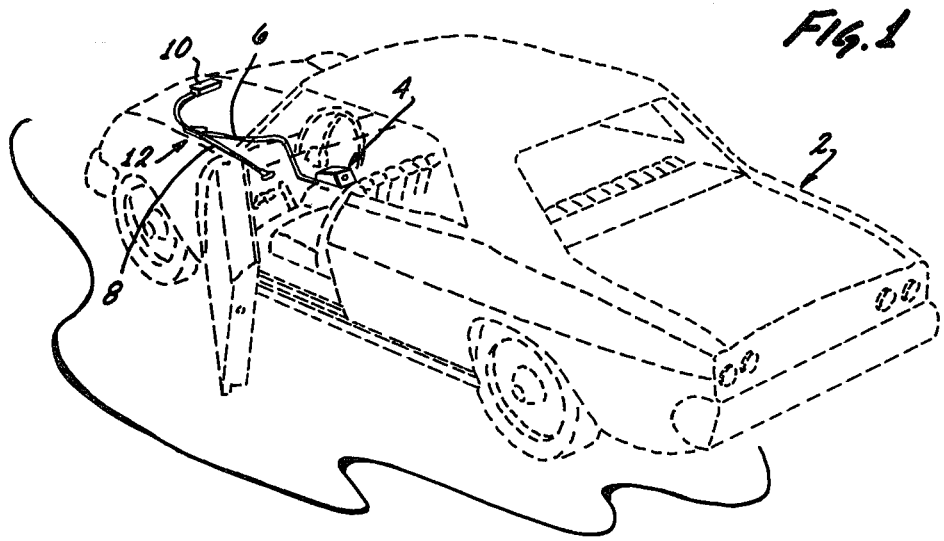
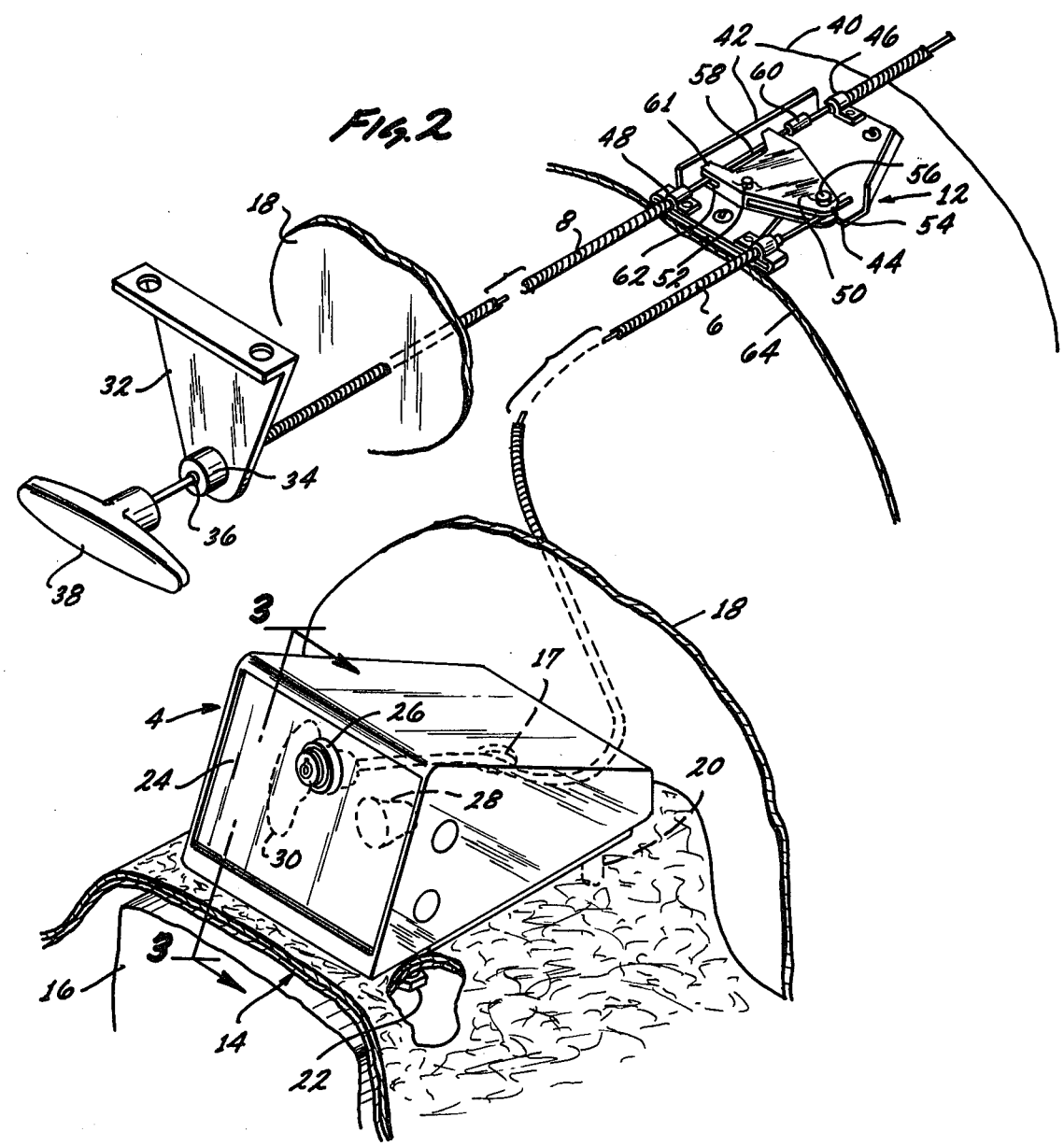

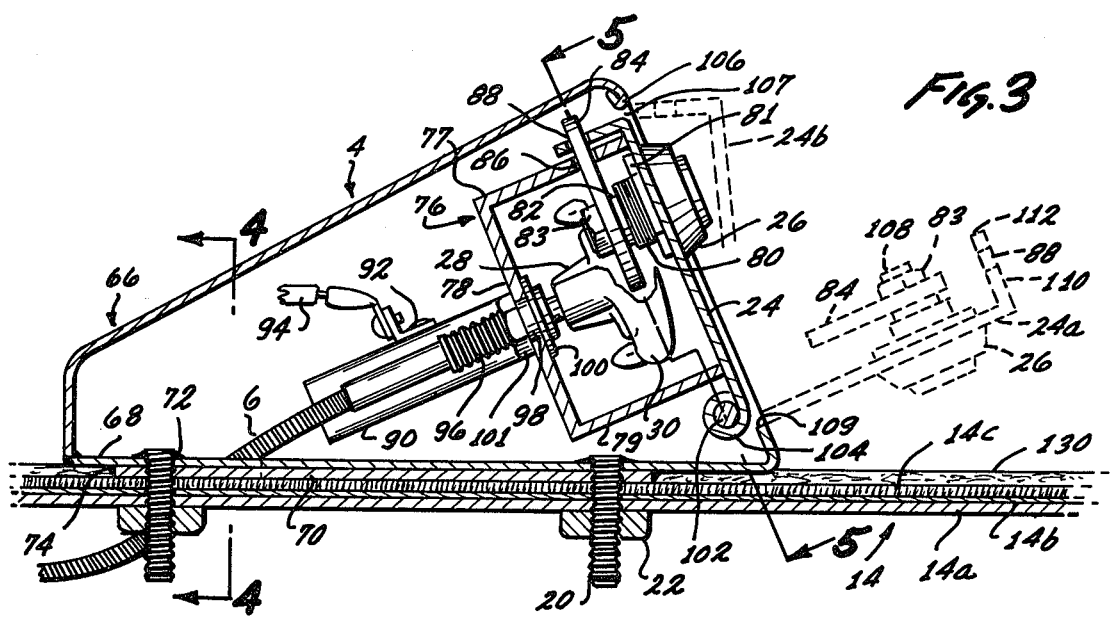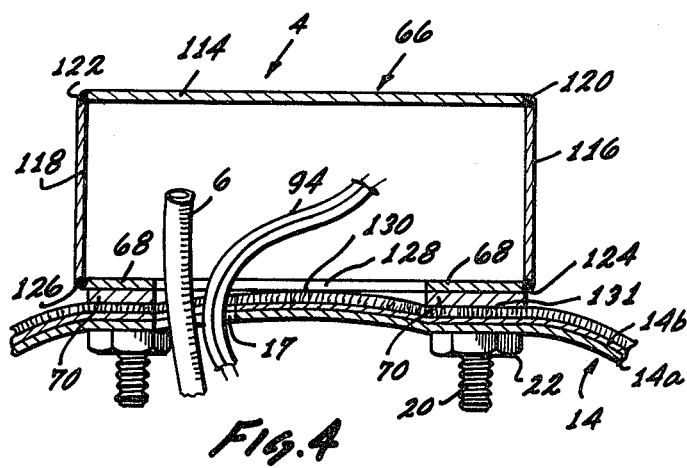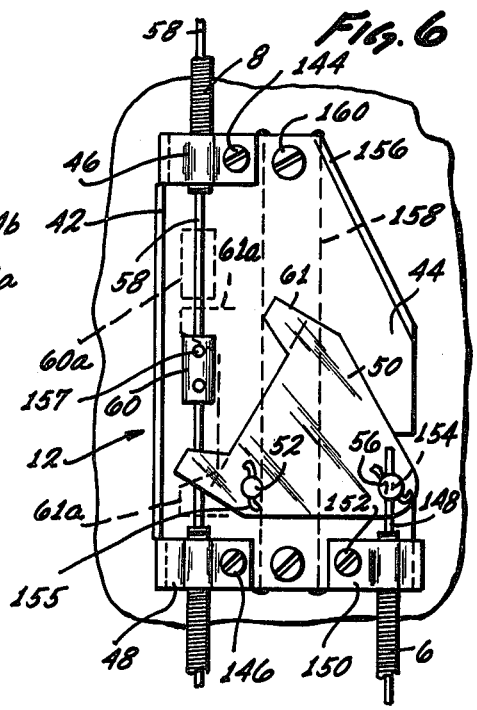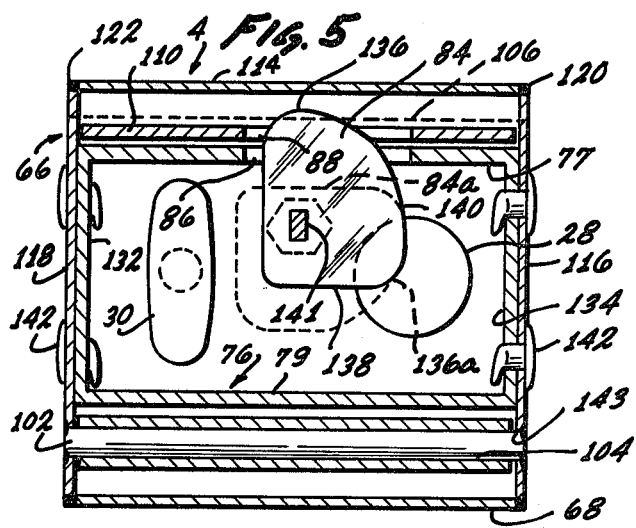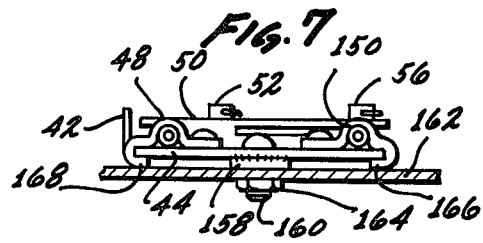

AUTOMOBILE LOCK MECHANISM

BACKGROUND OF THE INVENTION

With continued inflation, there has been a steady increase in the cost of automobiles. Further, with increases in the cost of automobiles and the cost of automobile repairs, there has been a steady increase in the cost of automobile insurance. One factor which has contributed greatly to the overall cost of automobile insurance is the problem of automobile theft.

An automobile can be stolen by a skilled thief in a matter of minutes or even seconds even though the automobile is, for all intents and purposes, securely locked. A thief may first gain access to the automobile passenger compartment by inserting a wire through the rubber molding which surrounds the automobile door or the automobile window. The ignition switch may, then, be bypassed by an operation known as "hot wiring." Further, if there is a lock on the steering wheel, the lock may be broken by giving the steering wheel a severe twist. The automobile may then be driven away to a secluded place where it is stripped so that very little remains of the automobile except a shell.

Due to the ease with which automobiles may be stolen by a professional, the theft of automobiles has become big business. Further, even in those cases where an automobile is recovered by the police, the automobile may be stripped so that it has little resemblance to the original automobile.

As stated, an automobile may be stolen by a professional in a matter of minutes or even seconds. To successfully avoid detection, it is important to the thief that the job can be carried off quickly. The threat of detection may increase tremendously as the amount of time required for the theft is increased. Thus, if theft of an automobile can be made sufficiently difficult, the automobile may be theft-proof since no thief in his right mind would take the risks involved in a lengthy theft procedure.

SUMMARY OF THE INVENTION

In solving the aforementioned problems, the present invention provides a locking apparatus which makes an automobile or other vehicle very difficult to steal and, thus, virtually theft-proof. The apparatus may include a vehicle having a motor compartment with motor means within the compartment and electrical means for starting the motor means. A latchable hood may enclose the motor compartment and a locking apparatus may be placed within the vehicle passenger compartment with the locking apparatus functioning to prevent starting of the motor means and to prevent access to the motor compartment. Thus, even though a thief may gain access to the vehicle passenger compartment, the thief would then be prevented from starting the motor means or from gaining access to the motor compartment.

The locking apparatus, which may be placed within the vehicle passenger compartment, may include a safe compartment having a door and means to lock the door. Switch means may be placed within the safe compartment with the switch means connected to the electrical means for the vehicle such that the motor means cannot be started when the switch means is in an inactive position. Additionally, a hood lock may be provided to maintain the hood in a locked condition. Actuating means for the hood lock may also be placed within the safe compartment along with the switch means so that it is necessary to open the safe compartment to gain access to the actuating means for opening of the hood or to gain access to the switch means for starting the motor means.

With the actuating means positioned to lock the hood, the door for the safe compartment is movable to its locked position. Additionally, means associated with the door for the safe compartment may move the switch means to an inactive position on movement of the door to its locked position. This ensures that the switch means cannot be inadvertently left in an active position during closing of the safe compartment door, which would permit starting of the motor means. Also, this ensures that the actuating means for the hood lock cannot be inadvertently left in a position which would permit opening of the hood when the door for the safe compartment is in a locked position. Thus, the present locking apparatus ensures that the motor means cannot be started and the hood cannot be opened when the door for the safe compartment is in its locked position.

Additionally, the present locking apparatus may include a hood latch release cable which is normally operable from within the passenger compartment. The hood lock may then be interconnected with the hood latch release cable to immobilize the release cable when the actuating means for the hood lock is positioned to lock the hood. With the door for the safe compartment in its locked position, the hood latch release cable, thus, cannot be operated in its normal manner from within the vehicle passenger compartment.

The safe compartment for the locking apparatus may include an outer shell formed of heavy gauge metal with an inner shell of heavy gauge metal positioned within the outer shell. Means are provided to interconnect the inner shell with the outer shell with operating means for the switch means and actuating means for the hood lock positioned within the inner shell. Additionally, the means to lock the door for the safe compartment may include a locking cam with a slot formed in the inner shell to receive the locking cam when the door is in its locked position.

The locking apparatus may also include an inwardly extending projection on the safe compartment door with a slot formed in the projection to receive the locking cam with the door in its locked position. Thus, the locking cam may provide a double locking action for the safe compartment door by engaging the slot in the inner shell for the safe compartment and also engaging the slot in the inwardly extending projection for the door.

To ensure that the switch means cannot inadvertently be left in an active position during closing of the door for the safe compartment, the locking cam may have a configuration which provides contact between the locking cam and the operating means for the switch means on movement of the door for the safe compartment to a locked position. Thus, the configuration of the locking cam ensures that the motor means cannot be started with the door for the safe compartment in a locked position.

The safe compartment may include an opening in the outer shell which receives the safe compartment door. A reinforced lip may be formed on the outer shell with the lip positioned closely adjacent to the opening for the safe compartment door to provide a small space between the lip and the safe compartment door with the door in its locked position. Additionally, the lip may be positioned to prevent access to the interconnection between the locking cam and the slot in the inner shell which receives the locking cam with the door in its locked position. Also, the locking cam and the slot in the inner shell which receives the locking cam may be positioned a substantial distance inwardly from the exterior surface of the safe compartment door with the door in its locked position. This also serves to prevent access to the interconnection between the locking cam and the slot in the inner shell which receives the locking cam.

The reinforced lip and the inwardly extending projection on the safe compartment door may be formed and positioned in such a manner that the inwardly extending projection barely clears the reinforced lip during closing of the safe compartment door. Also, the locking cam and the slot in the inwardly extending door projection may be positioned inwardly a substantial distance from the exterior surface of the safe compartment door with the door in its locked position.

In placing the safe compartment within the passenger compartment of a vehicle, the passenger compartment may include a floor which is curved upwardly to form a hump in the floor region which overlies the transmission means for the vehicle. The safe compartment may then have a bottom opening with thickened reinforced metal portions extending along either side of the bottom opening. Additionally, studs may be secured to the bottom of the safe compartment at the thickened reinforced metal portions with the hump having openings which receive the studs. Means may, then, be connected to the studs to secure the studs against the underside of the hump with the safe compartment, thus, being positioned above the transmission means.

An electrical lead from the switch means to the electrical means for the vehicle and means to transmit movement of the actuating means to the hood lock may pass through an opening in the hump. Also, the curvature of the hump may extend into the bottom opening in the safe compartment with the thickened reinforced metal portions of the safe compartment being fixedly connected to the hump. Thus, the safe compartment may be fixedly connected to the hump while the hump surface which is intermediate to the reinforced metal portions of the safe compartment extends into the bottom opening within the safe compartment. Further, in positioning the safe compartment on the hump surface within the vehicle passenger compartment, access to the safe compartment and to the leads from the safe compartment may be effectively blocked or shielded from access at a point beneath the vehicle by the presence of the transmission means.

In addition to the overall locking apparatus, as defined, the present invention also pertains to the construction of the safe compartment as discussed above.

BRIEF DESCRIPTION OF THE DRAWINGS

To provide a description of a specific embodiment of the invention, reference is made to the accompanying drawings in which:

FIG. 1 is a pictorial representation of an automobile having a locking apparatus therein which includes a safe compartment placed within the automobile passenger compartment with leads from the safe compartment to the motor compartment and to a hood lock to prevent starting of the engine when the door for the safe compartment is in a locked position;

FIG. 2 is an enlarged pictorial representation of the locking apparatus of FIG. 1 to illustrate the preferred location of the locking apparatus with respect to the automobile;

FIG. 3 is a sectional view taken along line 3—3 of FIG. 2 which illustrates the inner construction of the safe compartment and the manner in which the safe compartment may be affixed to a hump surface within the passenger compartment for the automobile;

FIG. 4 is a sectional view taken along line 4—4 of FIG. 3 illustrating the manner in which the hump surface within the passenger compartment may extend into the safe compartment through a bottom opening therein such that the safe compartment is rigidly affixed to the curved hump surface;

FIG. 5 is a sectional view taken along line 5—5 of FIG. 3 illustrating the shape and position of a locking cam within the safe compartment with the cam providing a double locking action for the safe compartment door while ensuring that the actuating means for the switch is positioned to deactivate the switch when the door is in a locked position;

FIG. 6 is an enlarged plan view of a locking means, as illustrated in FIG. 2, with which the hood latch cable may be immobilized to prevent access to the engine compartment, and FIG. 7 is an end elevation of the locking means of FIG. 6 which illustrates the manner in which the locking means may be fixedly secured to a support surface of the automobile.

DETAILED DESCRIPTION

FIG. 1 illustrates the placement of an automobile lock mechanism of the present invention within an automobile which is indicated in phantom line drawing as 2. The lock mechanism may include a lockable safe compartment 4 fixedly positioned within the passenger compartment with controls within the safe compartment which are necessary for starting the automobile and for preventing access to the automobile motor compartment.

To prevent access to the motor compartment, a lock cable 6 may lead from the safe compartment 4 to prevent the normal operation of a hood latch release cable 8. The hood latch release cable 8 may lead to a conventional release mechanism 10 which is positioned adjacent the front of the engine compartment to lock the engine hood in a lowered position. To prevent release of the release mechanism 10 by actuation of release cable 8, the lock cable 6 may terminate in a lock 12 which is connected to the release cable. As will be described, the lock 12 functions to immobilize the hood latch release cable 8. Thus, even if a thief were to gain access to the automobile interior, the hood latch release cable 8 could not be actuated without first unlocking the lock 12 through actuation of the lock cable 6. With the control for the lock cable 6 locked within the safe compartment 4, it would then be impossible to gain access to the engine compartment without first breaking into the safe compartment.

FIG. 2 is a pictorial representation of the locking mechanism positioned within an automobile in the manner shown in FIG. 1. To illustrate the position which the locking mechanism may have relative to the automobile, certain features of the automobile are shown such as a hump 14 in the automobile floor with the hump positioned above a transmission 16 which may extend rearwardly from the engine (not shown). The control devices placed within the safe compartment 4 may then communicate with the engine compartment through a hole 17 which extends through the hump 14 at a point adjacent to the fire wall 18. Threaded studs 20 on the safe compartment 4 may extend downwardly through corresponding holes in the hump 14 with nuts 22 in threaded engagement with the studs to secure the safe compartment against the hump.

With the safe compartment 4 positioned adjacent to the fire wall 18 on the upper surface of hump 14, the transmission 16 may have to be dropped to install the safe compartment. However, when the safe compartment 4 is installed on hump 14 and the transmission 16 is again in place, access to the nuts 22 is blocked by the transmission. Also, wires or cables leading from the safe compartment 4 to the engine compartment, such as the lock cable 6, may be positioned above the transmission 16 which blocks access to the cables or wires from a point beneath the automobile.

Time is of the essence in stealing an automobile since the thief must be able to steal the automobile within a short time period to avoid detection. Thus, it would be completely out of the question for a thief to steal an automobile if it were necessary to drop the transmission as a first step in the automobile theft. The position of the transmission 16 relative to the safe compartment 4 and to lock cable 6 is a very effective deterrent to theft of the automobile.

The safe compartment 4 may include a door 24 which may be maintained in a locked position by a lock 26. With the door 24 in locked position, a switch knob 28 and a lock cable handle 30 are then enclosed within the locked safe compartment 4. Access to the switch knob 28, as will be described, is necessary to start the automobile. Thus, unauthorized entrance into the passenger compartment would be of no avail in starting the automobile. Also, unauthorized entrance into the passenger compartment would be of no avail in gaining access to the engine compartment since the lock cable handle 30 is also enclosed within the safe compartment 4.

The hood latch release cable 8, as shown in FIG. 2, may pass through an aperture in the fire wall 18 with a bracket 32 in supporting engagement with the release cable. The bracket 32 may be mounted in a comventional manner within the passenger compartment with the bracket having a boss 34 and an aperture 36 with the release cable passing through the aperture. A hood release handle 38 may be secured to the inner end of the release cable 8 with movement of the release handle serving to unlock the hood latch release mechanism 10 as shown in FIG. 1. The hood latch release cable 8 may pass into a wheel well 40 with the lock 12 being positioned within the wheel well to make the lock inaccessible from a point beneath the automobile.

The lock 12 may include an upstanding base member 42 with a plate member 44 being positioned at approximately a right angle to the base member. The hood latch release cable 8 may be secured to the plate member 44 through support clips 46 and 48 which are connected in any convenient manner to the plate member. A lock plate 50 may be pivotally connected to the plate member 44 through a pivot 52 with the lock plate having a bifurcated upper end 54 and with a pin 56 passing through aligned apertures in the bifurcations. The wire of lock cable 6 may then be secured to the pin 54 such that actuation of the lock cable produces pivotal movement of the lock plate 50 about pivot 52.

The hood latch release cable 8 may include a bare wire portion 58 having a lock member 60 fixedly connected thereto. Ears 61 may be formed on the pivotal lock plate 50 with each ear defining a slot 62 which may engage the bare wire portion 58. Accordingly, when the pivotal lock plate 50 is rotated to its position shown in FIG. 2, the slots 62 engage the bare wire portion 58. As will be described, the ears 61 and slots 62 may cooperate to immobilize the position of the lock member 60. The lock member 60 is fixedly connected to the bare wire portion 58 and, thus, the immobilization of the lock member may immobilize the bare wire portion such that the hood latch release cable 8 cannot be actuated to open the hood latch release mechanism 10 shown in FIG. 1. In positioning the lock 12, etc., within the wheel well 40, the lock cable 6 and the hood latch release cable 8 may pass through a sidewall 64 which separates the wheel well from the engine enclosure.

FIG. 3 is a sectional view taken along line 3—3 of FIG. 2 which illustrates the interior of safe compartment 4 and the control mechanism which may be mounted therein. The safe compartment 4 may include an outer shell 66 which is formed of a heavy gauge metal having bottom plates 68 secured thereto along either side of the outer shell by any convenient means such as welding. Reinforcing plates 70 may be secured to the undersurface of the bottom plates 68 to provide a double plate thickness along either side of the outer shell 66. The threaded studs 20 which depend downwardly from the safe compartment 4 along either side thereof may then pass through apertures of the bottom plates 68 and reinforcing plates 70 with the threaded studs being fixedly secured to the bottom plates by welds 72. Further, in joining the reinforcing plates 70 to bottom plates 68, the plates may be secured together by any convenient means such as the welds 74.

In addition to having an outer shell 66, the safe compartment 4 may also have an inner shell 76 which is positioned within the outer shell. As illustrated, the inner shell 76 may include a top wall 77, an end wall 78, and a bottom wall 79 — all of which may be positioned in spaced relation to the outer shell 66. The lock 26 for the safe compartment door 24 may include a threaded shank 80 which passes through an aperture in the door 24 with a nut 81 threadedly engaging the shank and bearing against the inner surface of the door to fix the lock 26 to the door. A bushing 82 may be positioned adjacent the leading end of the threaded shank 80 with a locking cam 84 contacting the bushing and a lock nut 83 positioned against the locking cam. A rotatable shaft may extend axially through the threaded shank 80, as will be described, with the rotatable shaft supporting the locking cam 84. Thus, when a key is placed within the lock 26, the rotation of the key is transmitted through the rotatable shaft to the locking cam with the cam rotating in unison with the key.

With the safe compartment door 24 in a locked position, the locking cam 84, which has an eccentric configuration, is rotated into contact with a locking slot 86 formed in the upper wall 77 and into contact with a locking slot 88 formed in the door 24. The locking cam 84, when in its position shown in FIG. 3, provides a double locking action. The engagement of the cam 84 with locking slots 86 and 88 provides one lock between the door 24 and the inner shell 76. Also, the engagement of the cam 84 with the locking slot 86 and with the lock mechanism 26 provides a second lock between the door 24 and the inner shell 76. Thus, even if the locking cam were, in some manner, moved out of engagement with the locking slot 88, the door 24 would still be locked through engagement of the cam with locking slot 86.

Also, if the lock 26 were physically abused to in some manner sever the lock from the cam 84, the door 24 would still remain locked by contact of the cam 84 with locking slots 86 and 88.

A switch 90 may be secured to the end wall 84 by any convenient means such as by a nut or similar fastening device with an operating shaft for the switch extending through an aperture in the end wall and attaching to the switch knob 28. The switch 90 may include a connector 92 through which a wire 94 may be electrically connected to the switch. Thus, the switch 90, while completely enclosed within the safe compartment 4, may function through the wire 94 to disable the electrical system for the automobile when the switch is in an open position. Thus, the engine for the automobile cannot be started without first gaining access to the safe compartment 4 to move the switch 90 to its closed position.

The lock cable 6 may lead to a threaded connector 96 which extends through an opening 98 in the end wall 78. The connector 96 may include a base portion 100 which bears against the end wall 78 with a lock nut 101 threadedly engaging the connector 96 to bear against the end wall. The lock cable 6 may, thus, be operatively engaged with the handle 30 positioned within the safe compartment 4. To gain entrance to the engine compartment, it may, thus, first be necessary to gain access to the safe compartment 4 and to move the handle 30 to actuate the lock cable 6.

The safe compartment door 24 may be rotatably mounted upon a shaft 102 that may be fixed between the sidewalls of the outer shell 66. The lower portion of the door 24 may form a rolled cavity 104 which is positioned about the shaft 102. Additionally, the outer shell 66 may be contoured to form a rolled lip 106 that is positioned closely adjacent to the upper portion of the door 24 when the door is closed in a locked condition. As shown, the close proximity of the rolled lip 106 to the door 24 leaves only a small space 107 between the lip and the door when the door is closed. The small space 107 does not offer sufficient room for the insertion of a tool that might be used by a thief in attempting to gain entrance to the safe compartment 4 or to contact the locking cam 84 in attempting to move the locking cam out of engagement with locking slots 86 and 88. Further, the double thickness of metal provided by the rolled lip 106 strengthens the safe compartment 4 in the region adjacent to the small space 107. The strength provided by the rolled lip 106 serves to prevent deformation of the lip through the attempted insertion of a prying tool into the small space 107 in an effort to enlarge the small space.

When the safe compartment door 24 is rotated to a fully opened position, the door may occupy the position indicated in phantom line drawing as 24a with the front surface of the door resting on a stop 109 formed by the outer shell 66. With the door in position 24a, certain structural features are more easily identified since the door is moved away from the interior of safe compartment 4 and the structure contained therein. With the door in its opened position 24a, it can be seen that the lock 26 includes a central rotatable shaft 108 which transmits rotational movement from the lock to the locking cam 84. Also, the door, as indicated at 24a, may include an inward projection 110 which extends inwardly into the interior of the safe compartment 4 when the door is rotated to its closed position. The inward projection 110 may include the locking slot 88, as previously described, which is engaged by the locking cam 84 when the door is in a locked condition. Also, the inward projection 110 may terminate at an inner end 112.

During closing of the safe compartment door, the door may be rotated upwardly from its opened position 24a to an intermediate position 24b. With the door in its intermediate position 24b, the inner end 112 is positioned in close proximity to the rolled lip 106. Thus, the precise placement of the rolled lip 106 provides a minimum clearance between the inner end 112 and the lip during closing of the door 24. Additionally, the position of the rolled lip 106, when coupled with the length of the inward projection 110 and the position of the slot 88 therein, provides a lock construction which is very resistant to being forced opened by unauthorized means. The length of the inward extension 110 places the slot 88 a considerable distance inward from the outer surface of the door 24 and well within the interior of the safe compartment 4 when the door is in a locked condition. This, together with the small space 107 between the door 24 and the rolled lip 106, makes the locking cam 84 inaccessible from a point outside the safe compartment 4.

As also shown in FIG. 3, the automobile floor at the hump 14 may be composed of several distinct layers. These layers are indicated as 14a, 14b and 14c. Also, because of the upward curvature of the hump 14 at the location of the safe compartment 4, a line 130 indicates the uppermost curvature of the hump surface as will be further described in regard to FIG. 4.

FIG. 4 is a sectional view through the safe compartment 4 taken along line 4—4 of FIG. 3 which illustrates the construction of the safe compartment in terms of its positioning upon the curved surface of the hump 14. The outer shell 66, as indicated, includes a top sheet 114 which may be formed of heavy gauge metal with the top sheet angled downwardly with respect to the base of the safe compartment 4 as shown in FIG. 3. Side sheets 116 and 118 may then be connected to the top sheet 114 by any suitable means to form an integral structure. The side sheets 116 and 118 may also be formed of heavy gauge metal with the side sheets being joined to the top sheet 114, for example, by welds 120 and 122. Additionally, the side sheets 116 and 118 may be joined to the bottom side plates 68 along welds 124 and 126 with a center opening 128 being, thereby, provided between the bottom side plates.

As indicated, the increased thickness which may be provided by joinder of the bottom side plates 68 to the reinforcing plates 70 permits the hump 14 to curve upwardly into the center opening 128 with the uppermost curvature of the hump indicated as 130. The curved surface of the hump 14 may be somewhat flattened in the areas 131 which are contacted by the undersurfaces of the reinforcing plates 70. However, the continued upward curvature of the hump 14 to the point of uppermost curvature 130 is not impeded by the safe compartment 4 due to the presence of the center opening 128. The close proximity of the center opening 128 to the curved surface of the hump 14 coupled with the rigid connection of the safe compartment 4 with the hump through studs 20 prevents access to the interior of the safe compartment through the bottom center opening. Also, the wire 94 and lock cable 6 may be conveyed through the hole 17 with the wire and lock cable then being positioned above the transmission 16 as described in FIG. 2.

FIG. 5 is a sectional view taken along line 5—5 of FIG. 3 which illustrates in additional detail the structural relationship between the inner shell 76 and the outer shell 66. The inner shell 76 includes sidewalls 132 and 134 which, together with the top wall 77, end wall 78 and bottom wall 79 (see FIG. 3), may form a five-sided enclosure that is positioned within the outer shell 66. With the door 24 in a locked position, a toe portion 136 on the locking cam 84 may extend through the locking slots 86 and 88 to provide a double lock between the door and the inner shell 76.

With the toe 136 of locking cam 84 positioned within slots 86 and 88, a heel portion 140 on the locking cam is positioned in overlying relation to the switch knob 28. Accordingly, it is not possible to close the door 24 and to rotate the locking cam 84 into engagement with slots 86 and 88 with the switch knob 28 in an extended position, i.e., pulled away from the end wall 78 of inner shell 76. In operation, the switch knob 28 is pulled away from the end wall 78 to close the switch 90 (see FIG. 3) to permit starting of the automobile engine. However, it is impossible to close the safe compartment door 24 with the switch knob 28 in its extended position. Thus, closing of the door 24 necessarily moves the switch knob 28 inwardly to open the switch 90 and to deactivate the electrical system for the automobile such that is makes it impossible to start the automobile engine. This is a useful safety feature since it ensures that the safe compartment 4 cannot be locked while the switch 90 is closed to permit starting of the automobile from the ignition.

In addition to a toe portion 136 and a heel portion 140, the locking cam 84 may also include a base portion 138. When the safe compartment door is rotated outwardly to its unlocked position indicated as 24a in FIG. 3, the locking cam 84 may be rotated approximately 90 degrees to its position indicated in phantom line drawing as 84a. In rotating the locking cam to its position indicated as 84a, a key must, of course, be inserted in the lock 26 (FIG. 3) with the key being indicated in cross section as 141. With the locking cam rotated to position 84a, it can be observed that no matter what the rotational position of the locking cam, the cam overlies the switch knob 28. Thus, it is impossible to close the safe compartment door 24 with the switch knob 28 in an extended position, irrespective of the rotational position of the locking cam 84.

The lock cable handle 30, as shown in FIG. 5, may function through the lock cable 6 to disengage the lock 12 from the hood latch release cable 8 (see FIG. 2). In its extended position, the lock cable handle 30 is pulled away from the end wall 78 to release the lock 12 such that the hood latch 10 may be opened by actuation of hood latch release cable 8. However, with lock cable handle 30 in an extended position, the safe compartment door 24 cannot be moved to a closed position. This is also a safety precaution since it prevents the accidental locking of the safe compartment 4 with the lock cable handle 30 in a position which would permit opening of the hood latch from the passenger compartment.

The inner shell 76 may be fixedly positioned with respect to the outer shell 66 by any suitable means such as a plurality of rivets 142. As illustrated, the rivets 142 extend through apertures in the sidewalls 116 and 118 of the outer shell 66 and then through apertures in the sidewalls 134 and 132 of the inner shell 76. Additionally, the shaft 102 may be press fit within aligned apertures 143 which are formed in sidewalls 116 and 118. The rolled cavity 104, thus, extends about the exterior surface of shaft 102 to provide for rotational movement of the safe compartment door 24 about the shaft 102.

FIG. 6 is an enlarged plan view of the lock 12, as described in FIG. 2, which functions to immobilize the hood latch release cable 8 so that the automobile hood cannot be opened. As shown, the support clip 46 which engages the hood latch release cable 8 may be secured to the plate member 44 by means of a screw 144 or similar fastening means. Also, the support clip 48 may be secured to the plate member 44 in like manner through use of a screw 146. The hood latch release cable 8 is, thereby, secured to the plate 44 on either side of the bare wire portion 58 which has the lock member 60 secured thereto.

The lock cable 6 has an exposed cable wire 148 that is connected to the pivotal lock plate 50 which functions to immobilize the release cable 8 through engagement with the lock member 60. The lock cable 6 is secured to plate member 44 through a support clip 150 that may be connected to the plate member in any suitable manner such as by the use of a screw 152. With the lock cable 6, thus, fixedly secured to the plate member 44, the exposed cable wire 148 may pass through an aperture 154 formed in the pin 56. After passage through aperture 154, the end of the exposed cable wire 148 may be deformed in some manner to prevent withdrawal of the exposed wire from the aperture. On actuation of the lock cable 6 to provide movement of the exposed cable wire 148, the lock plate 50 may be pivoted to a position as shown in FIG. 6, in which the ears 61 do not impede movement of the lock member 60. The hood latch release cable 8 may then be actuated in a normal manner to release the hood latch so that the automobile hood may be opened.

On pivotal movement of the lock plate 50 in a counterclockwise direction from its position shown in FIG. 6, the ears 61 may be brought into engagement with the bare wire portion 58 with the ears functioning to prevent movement of the lock member 60. The position of the ears 61 in locking engagement with lock member 60 is indicated in phantom line drawing in FIG. 6 as 61a with the lock member imprisoned between the ears. With the lock plate 50 in unlocked position as shown in solid line drawing in FIG. 6, the lock member 60 is free to move and, for example, may undergo movement to a position such as that indicated in phantom line drawing as 60a.

In securing the pivotal lock plate 50 to the pivot 52, a lock wire 155 or any suitable means may be used to prevent movement of the lock plate in an axial direction relative to the pivot such that the lock plate could become disengaged from the pivot. The lock wire 155 may extend through an aperture (not shown) in the pivot 52 such that the lock plate 50 cannot be withdrawn from the pivot without first removing the lock wire.

To provide strengthening of the plate member 44, an upstanding reinforcement member 156 may be formed integrally with the plate member along one side thereof. Additionally, the pin 56 may serve as a stop in limiting the rotational movement of the lock plate 50. Thus, for example, the pin 56 may have a length which extends on either side of the lock plate 50 such that the pin engages the sheath surrounding the lock cable 6 when the plate is rotated to a given extent. Also, the position of the lock member 60 may be varied with respect to the bare wire portion 58 by the use of set screws 157 which threadedly engage apertures in the lock member with the ends of the set screws contacting the bare wire portion.

In securing the lock 12 to a supporting surface, a reinforcement member 158 may be secured to the plate member 44 in any suitable manner, such as by screws 160. As illustrated in FIG. 7, which is a sectional view through the lock 12 as shown in FIG. 6, the screws 160, in addition to passing through reinforcement member 158, may also pass through apertures in a support member 162. The ends of the screws 160 may then be threadedly engaged by nuts 164 which bear against the undersurface of the support member 162. Additionally, the clips 48 and 150 may extend around the plate member 44 to provide bearing portions 166 and 168 which also contact the support surface 162. In this manner, the lock 12 may be supported along either side by the bearing portions 166 and 168 while being supported along its mid-portion by the reinforcement member 158. This, then, maintains the lock 12 in a flat position relative to the surface of the support member 162.

As a further safety measure, the safe compartment 4, as shown in FIGS. 3 and 5, may remain locked even if the rivets 142 are sheared off. Assuming the rivets 142 to be sheared off, an outward pull on the door 24 may rotate the inner shell 76 about the shaft 102. This may then bring the locking cam 84 into contact with the lip 106 and may also jam the inner shell 76 against the top sheet 114 of the outer shell 66.

In the foregoing description, the lock mechanism has been illustrated with respect to an automobile with the engine compartment positioned at the front of the automobile. However, it is not necessary that the engine be positioned at the front of the vehicle and the present mechanism may be used with an automobile where the engine is positioned in the rear. In this application, the leads from the safe compartment 4 may be directed rearwardly to lock the engine compartment and to disable the electrical system for the engine.

Also, the present lock mechanism may be used for wheeled vehicles other than automobiles, such as trucks or tractors. Additionally, the present lock mechanism may be used for any type of vehicle, such as a boat or an airplane, since the disablement of the electrical system for the engine and the locking of the engine compartment in preventing theft does not require that the vehicle be wheeled or that the vehicle travel on the ground.

I claim:

1. A safe compartment for usage with a locking apparatus for a vehicle comprising:
   an outer shell of heavy gauge metal;
   an inner shell of heavy gauge metal positioned within said outer shell;
   said inner shell providing a panel for switch means to be positioned within the safe compartment;
   a door for the safe compartment which is movable to a closed position;
   means associated with the door to move the switch means to an inactive position toward said panel means upon movement of the door to its closed position;
   said means associated with the door including a locking cam secured to said door, and
   a slot in said inner shell to receive the locking cam with the door in its closed position,
   said locking cam having a position and a configuration to move the switch means to an inactive position toward said panel on movement of the door to its closed position.

2. The safe compartment of claim 1 including
   an opening in said outer shell which receives said door;
   a reinforced lip formed on said outer shell with the lip positioned closely adjacent to said opening,
   said lip positioned to provide a small space between the lip and the door with the door in its closed position and to shield the locking cam and the slot in said inner shell from access when the door is in its closed position.

3. The safe compartment of claim 2 wherein
   said locking cam and the slot in the inner shell to receive the locking cam are positioned a substantial distance inwardly from the exterior surface of the door with the door in its closed position.

4. The safe compartment of claim 1 including
   a bottom opening and thickened reinforced metal portions extending along either side of the bottom opening;
   studs secured to the bottom of the safe compartment at the thickened reinforced metal portions, and
   the width of the bottom opening together with the thickness of the reinforced metal portions permitting the fixation of the safe compartment on a curved support surface with the support surface extending into the bottom opening in the safe compartment.

5. A locking apparatus comprising, in combination:
   a vehicle including a motor compartment, motor means within said compartment for powering said vehicle, a latchable hood for enclosing said compartment, electrical means for operating said motor means, and a passenger compartment;
   a safe compartment positioned within said passenger compartment;
   said safe compartment including an outer shell of heavy gauge metal, an inner shell of heavy gauge metal positioned within said outer shell, said inner shell providing an instrument panel within the safe compartment, a door for the safe compartment which is movable between an opened position and a closed position, and means to lock the safe compartment door when it is in a closed position;
   switch means positioned within said safe compartment on said instrument panel;
   said switch means being connected to said electrical means to disconnect the electrical means from the motor means with the switch means in its inactive position;
   a hood lock for maintaining said hood in a locked and latched condition;
   and actuating means for said hood lock positioned within said safe compartment, said door being movable to said closed position only when said actuating means is positioned to lock said hood; said means to lock the safe compartment door including a locking cam mounted on the inner side of said door for movement between a locked and an unlocked position, and means on one of said shells to receive and engage said locking cam when said door is in said closed position and said cam is moved to said locked position, said locking cam engaging and moving said switch means to said inactive position when said door is moved to said closed position.

6. The locking apparatus of claim 5 including
   a hood latch release cable operable from within said passenger compartment, and said hood lock connected to said hood latch release cable to immobilize said release cable with the actuating means for the hood lock positioned to lock the hood.

7. The locking apparatus of claim 5 wherein said actuating means is positioned within said inner shell, and said means to receive and engage said cam includes a slot in said inner shell.

8. The locking apparatus of claim 7 including
   an opening in said outer shell which receives said door;
   a reinforced lip formed on said outer shell with said lip positioned closely adjacent to said opening to provide a small space between the lip and the door with the door in its closed position, and
   said lip positioned to shield the interconnection between the locking cam and the slot in said inner shell from access when the door is in its closed position.

9. The locking apparatus of claim 8 wherein
   said locking cam and the slot in the inner shell to receive the locking cam are positioned a substantial distance inwardly from the exterior surface of the door with the door in its closed position.

10. The locking apparatus of claim 7 including
    a floor within said passenger compartment;
    transmission means extending from said engine means beneath said floor;
    said floor being curved upwardly to form a hump in the floor region overlying said transmission means;
    said safe compartment having a bottom opening and thickened reinforced metal portions extending along either side of said bottom opening;
    studs secured to the bottom of said safe compartment at said thickened reinforced metal portions;
    openings in said hump which receive said studs and means connected to said studs to secure the studs against the underside of the hump in a position above the transmission means;
    an electrical lead from said switch means to said electrical means;
    means to transmit movement from said actuating means to said hood lock;
    an opening in said hump to receive said electrical lead and said means to transmit movement, and
    the curvature of said hump extending into the bottom opening in the safe compartment with the thickened reinforced metal portions fixedly contacting said hump,
    whereby the safe compartment is fixed to the hump with the reinforced metal portions positioned flat against the hump surface while the curved hump surface intermediate the reinforced metal portions extends inwardly into the bottom opening in the safe compartment.

11. A locking apparatus comprising, in combination:
    a vehicle including a motor compartment, motor means within said compartment for powering said vehicle, a latchable hood for enclosing said compartment, electrical means for operating said motor means, and a passenger compartment;
    a safe compartment positioned within said passenger compartment;
    said safe compartment including an outer shell of heavy gauge metal, an inner shell of heavy gauge metal positioned within said outer shell, said inner shell providing an instrument panel within the safe compartment, a door for the safe compartment which is movable between an opened position and a closed position, and means to lock the safe compartment door when it is in a closed position;
    switch means positioned within said safe compartment on said instrument panel;
    said switch means being connected to said electrical means to disconnect the electrical means from the motor means with the switch means in its inactive position;
    a hood lock for maintaining said hood in a locked and latched condition;
    actuating means for said hood lock positioned within said safe compartment;
    said door being movable to its closed position when said actuating means is positioned to lock said hood;
    means associated with the safe compartment door to move the switch means to an inactive position toward said panel on movement of the safe compartment door to its closed position;
    means interconnecting said inner shell with said outer shell;
    operating means for said switch means;
    said actuating means and said operating means positioned within said inner shell;
    said means to lock said door including a locking
    cam mounted on said door for movement between a locked and an unlocked position, a slot in said inner shell, an inwardly extending projection on said door, and a slot in said projection, whereby said locking cam is received by said slots in said locked position.

12. The locking apparatus of claim 11 wherein the means to move the switch means to an inoperative position includes
    said locking cam having a configuration which provides contact between the locking cam and the operating means for said switch means on movement of the door to said closed position,
    whereby the configuration of the locking cam insures that the safe compartment door cannot be moved to said closed position without moving the switch means to an inactive position which prevents starting of the motor means.

13. The locking apparatus of claim 11 including
    an opening in said outer shell which receives said door;
    a reinforced lip formed on said outer shell with said lip positioned closely adjacent to said opening to provide a small space between the lip and the door with the door in its closed position;
    said projection having a size and a position relative to the door which provides close clearance between the lip and the door during closing of the door, and
    said lip being positioned to shield the interconnection between the locking cam and the slot in said projection from access when the door is in its closed position.

14. The locking apparatus of claim 13 wherein
    said locking cam and the slot in the door projection to receive the locking cam are positioned inwardly a substantial distance from the exterior surface of the door with the door in its closed position.

15. A safe compartment for usage with a locking apparatus for a vehicle comprising:
    an outer shell of heavy gauge metal;
    an inner shell of heavy gauge metal positioned within said outer shell;

said inner shell providing a panel for switch means to be positioned within the safe compartment;

a door for the safe compartment which is movable to a closed position;

means associated with the door to move the switch means to an inactive position toward said panel on movement of the door to its closed position;

a locking cam secured to said door;

a slot in said inner shell to receive the locking cam with the door in its closed position;

an inwardly-extending projection on said door, and a slot in said projection to receive said locking cam with the door in its closed position, whereby the locking cam provides a double locking action for said door through engagement with the slot in said inner shell and the slot in said door projection.

16. The safe compartment of claim 15, wherein said means associated with the door includes said leading cam having a position and a configuration to move the switch means to an inactive position toward said panel on movement of the door to its closed position.

17. The safe compartment of claim 15 including an opening in said outer shell which receives said door;

a reinforced lip formed on said outer shell with said lip positioned closely adjacent to said opening to provide a small space beween the lip and the door with the door in its closed position;

said projection having a size and a position relative to the door which provides close clearance between the lip and the door extension during closing of the door, and said lip being positioned to shield the interconnection between the locking cam and the slot in said door projection from access when the door is in its closed position.

18. The safe compartment of claim 17 wherein said locking cam and the slot in the door projection to receive the locking cam are positioned inwardly a substantial distance from the exterior surface of the door with the door in its closed position.

* * * * *